Dec. 20, 1966 A. H. BOBECK 3,293,623

MAGNETIC MEMORY MATRIX ASSEMBLY

Filed June 6, 1963

INVENTOR
A. H. BOBECK
BY William H. Kamstra
ATTORNEY

United States Patent Office 3,293,623

Patented Dec. 20, 1966

3,293,623
MAGNETIC MEMORY MATRIX ASSEMBLY

Andrew H. Bobeck, Chatham, N.J., assignor to Bell Telephone Laboratories, Incorporated, New York, N.Y., a corporation of New York Filed June 6, 1963, Ser. No. 285,993
6 Claims. (Cl. 340—174)

Figure 1:
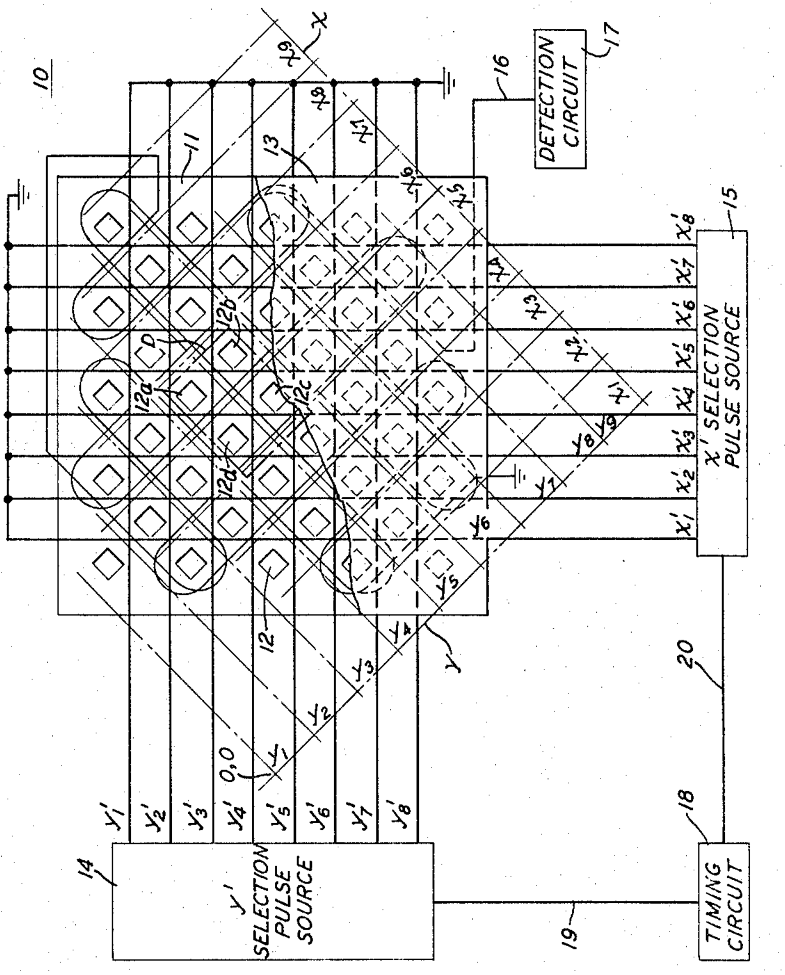

This invention relates to magnetic memory circuits. More particularly this invention relates to a circuit arrangement adapted for use in conjunction with a "waffle iron" memory structure, so called, of the type described in a copending application Serial No. 215,318 of A. H. Bobeck and J. L. Smith, filed August 7, 1962.

The waffle iron memory structure employs a base plate of low reluctance material having posts protruding therefrom arranged typically in an array of rows and columns. A plate of a material having substantially rectangular hysteresis characteristics overlies the posts and provides therein distinct flux addresses for which flux closure paths are available through neighboring posts and the base plate. Such a construction is particularly advantageous because it permits a relatively high-density storage capacity as compared to other ferrite sheet constructions and further permits higher information processing rates.

In one conventional mode of operation, for example, the posts of the waffle iron structure are coupled by a plurality of first and second conductors which follow paths along the rows and columns of the array of posts forming a unique intersection therebetween for each adjacent four posts of the array and thus coupling a distinct information address in each between-posts length of the plate of magnetic material directly overlying each intersection. Information, for example, a binary "1," is stored in a particular address by coincident pulses commonly termed "half select" pulses applied to the proper first and second conductors during a write phase of operation. A single third conductor is coupled to each information address for transmitting to a detector the response induced therein by flux switching in the selected address during a read phase of operation. This flux switching is caused by applying to the proper first and second conductors coincident half select pulses of a polarity opposite to that applied for storing the "1" during the write phase. Such an arrangement is commonly termed a "coincident current" waffle iron memory.

It is an object of this invention to provide a new and novel wiring arrangement for a waffle iron memory in order to increase the storage capacity thereof.

The above and further objects of this invention are realized in one specific embodiment thereof wherein the coordinate first and second conductors of a coincident current waffle iron memory of the type generally described hereinbefore are oriented not along the rows and columns of the array of posts but along the diagonals of the array of posts thus providing a unique coupling of the first and second conductors between each post and its adjacent posts in the rows and columns of the array.

Accordingly, it is a feature of this invention that each adjacent two posts in a row and column of an array of waffle iron posts includes therebetween a unique coupling of the plurality of first and second conductors, defining a bit address in the overlay magnetic material thereabove and thus enabling a substantial increase in the storage capacity of prior art waffle iron memories.

Figure 2:
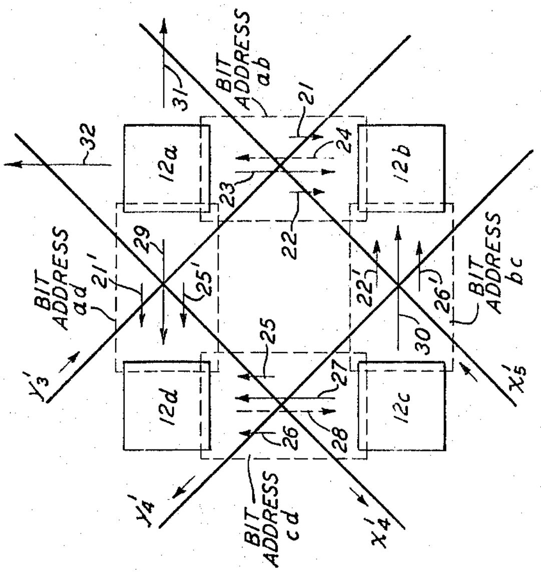

The invention and the objects and features thereof will be understood more fully from the following detailed description of one illustrative embodiment thereof rendered in connection with the accompanying drawing wherein:

FIG. 1 illustrates a specific illustrative waffle iron memory in accordance with this invention; and FIG. 2 illustrates schematically the spatial arrangement of a four post section of the waffle iron memory of FIG. 1 and the accompanying word and digit conductors.

It is to be understood that the figures are not necessarily to scale, certain dimensions therein being exaggerated for illustrative purposes only.

FIG. 1 shows a coincident current waffle iron memory 10 in accordance with this invention. The memory 10 comprises a substantially rectangular base plate 11 of relatively low reluctance material having a plurality of posts 12 protruding therefrom. The posts 12 are arranged in one convenient orientation along skew columns $x_1$, $x_2 \ldots x_9$ and skew rows $y_1$, $y_2 \ldots y_9$ which lie substantially diagonally with respect to the rectangular base plate 11. Recesses diagonal with respect to the $x$ and $y$ columns and rows thus resulting between the posts are designated $x'_1$, $x'_2 \ldots x'_8$ and $y'_1$, $y'_2 \ldots y'_8$, which diagonals then lie substantially parallel to the sides of the base plate 11 and which correspond with associated conductors as will become apparent immediately hereinafter. A sheet 13 (shown partially broken in the figure) of magnetic material having a substantially rectangular hysteresis characteristic overlies all the posts 12. In this connection, sheet 13 may be urged into direct contact with the underlying posts in order that the air gap therebetween is reduced for reducing the total reluctance of the magnetic circuit there.

A plurality of $y'$ conductors $y'_1$, $y'_2 \ldots y'_8$ thread the correspondingly designated diagonal recesses of the array of posts and are connected, at one end, to a $y'$ selection pulse source 14 and at the other end to ground. Similarly, a plurality of $x'$ conductors $x_1'$ $x_2' \ldots x_8'$ thread the correspondingly designated diagonal recesses of the array of posts and are connected, at one end, to an $x'$ selection pulse source 15 and connected at the other end to ground.

A single sensing conductor 16 threads between the posts of the array specifically in an alternating direction between the posts of rows $y_8$–$y_7$, $y_7$–$y_6$, $y_6$–$y_5$, $y_5$–$y_4 \ldots$, et seq., and then again in an alternating direction between the posts of columns $x_9$–$x_8$, $x_8$–$x_7$, $x_7$–$x_6$, $x_6$–$x_5 \ldots$, et seq., in order to couple each bit address of the memory. The conductor 16 is connected, at one end, to a detection circuit 17 and is connected at the other end to ground.

A timing circuit 18 is connected to pulse sources 14 and 15 by means of conductors 19 and 20, respectively. In this connection the timing cricuit 18 may be any well known circuit capable of controlling the operation of the pulse sources described in a manner suitable in accordance with this invention.

Similarly, the pulse sources 14 and 15 may be any well known bipolar pulse sources capable of selectively energizing selected rows $y$ and columns $x$ respectively in a manner suitable in accordance with this invention. Detection circuit 17 may be any well known detection circuit capable of utilizing an output pulse of a positive or negative polarity as is described hereinafter.

The organization and principles of the memory of FIG. 1 and the advantages thereof will be understood more easily in light of a description of an illustrative operation thereof with particular reference to FIG. 2.

FIG. 2 shows an arrangement of four posts 12*a*, 12*b*, 12*c* and 12*d*, corresponding to a portion of FIG. 1 encompassed by broken line D and including a group of bit addresses. However, in FIG. 2, that portion is oriented such that the $x$ and $y$ columns and rows of FIG. 1 are vertical and horizontal respectively in the plane of the page to emphasize the diagonal position of the $x'$ and $y'$ conductors with respect thereto. For simplicity, the sheet 13 and the base plate 11 are omitted from FIG. 2.

For storing a binary "1" in a bit address, for example, bit address *ab* shown in FIG. 2, a positive substantially half select pulse is applied by sources 15 and 14 of FIG. 1 respectively, under the control of timing circuit 18, to each of the conductors $x_5'$ and $y_3'$ of FIG. 2. In this connection, the term "half select" characterizes a pulse insufficient by itself to cause flux switching in the adjacent portion of the overlay but when accompanied by a second coincident half select pulse is sufficient to cause flux switching there. In response to the pulse in conductor $y_3'$ a magnetic field is established thereabout tending to orient flux in the direction of the lowest reluctance path, that is, downward in the portion of overlay 13 of FIG. 1 between posts 12*a* and 12*b* as indicated by arrow 21 in FIG. 2. Similarly, the half select pulse in conductor $x_5'$ tends to orient flux downward in the portion of overlay 13 of FIG. 1 between posts 12*a* and 12*b* as indicated by arrow 22 in FIG. 2. As a result of the resultant field produced by these coincident half select pulses applied during the write phase to the conductors $x_5'$ and $y_3'$, flux is switched to a first remanent condition, that is, downward in the overlay 13 of FIG. 1 between posts 12*a* and 12*b* as indicated by the arrow 23 of FIG. 2.

The writing of a binary "0" in bit address *ab*, on the other hand, is effected by applying from source 14, under the control of timing circuit 18, a positive pulse in the $y_3'$ conductor only, there being no coincident pulse applied to the conductor $x_5'$. In the absence of a coincident pulse in the $x_5'$ conductor during the write phase, the pulse in the $y_3'$ conductor produces only insignificant shuttle pulses in bit address *ab* thus storing a "0," that is, leaving the overlay 13 of FIG. 1 in a second remanent condition as illustrated by the dashed arrow 24 of FIG. 2. Thus a "0" stored in the bit address *ab* appears as flux directed oppositely to that shown by the corresponding arrow representing a stored "1." It is noted that the direction of the arrow 24 is taken to be the second remanent condition for bit address *ab*.

Similarly, a binary "1" is stored in bit address *cd* by applying from sources 15 and 14 of FIG. 1 respectively, under the control of timing circuit 18, a negative substantially half select pulse to each of the conductors $x_4'$ and $y_4'$ of FIG. 2. In response to the pulse in conductor $x_4'$ a magnetic field is established thereabout tending to orient flux in the direction of the lowest reluctance path, that is, upward in the portion of the overlay 13 of FIG. 1 between posts 12*c* and 12*d* as indicated by arrow 25 in FIG. 2. Similarly, the pulse in conductor $y_4'$ tends to orient flux upward in the portion of overlay 13 of FIG. 1 between posts 12*c* and 12*d* as indicated by arrow 26 of FIG. 2. As a result of the resultant field produced by these coincident half select pulses applied during the write phase to the conductors $x_4'$ and $y_4'$, flux is switched to a first remanent condition, that is, upward in the overlay 13 of FIG. 1 between posts 12*c* and 12*d* as indicated by the arrow 27 of FIG. 2.

The writing of a binary "0" in bit address *cd*, on the other hand, is effected by applying from source 14, under the control of timing circuit 18, a negative pulse in the $y_4'$ conductor only, there being no coincident pulse applied to the conductor $x_4'$. In the absence of a coincident pulse in the $x_4'$ conductor during the write phase, the pulse in the $y_4'$ conductor produces only insignificant shuttle pulses in bit address *cd*, thus storing a "0," that is, leaving the bit address in a second remanent condition as illustrated by dashed arrow 28 of FIG. 2. Thus a "0" stored in bit address *cd* appears as flux directed oppositely to that shown by the corresponding arrow representing a stored "1" there. It is noted that the direction of the arrow 28 is taken to be the second remanent condition for bit address *cd*.

A comparison between the direction of arrows 23 and 24 of bit address *ab*, on the one hand, and arrows 27 and 28 of bit address *cd*, on the other hand, representing a stored "1" and a stored "0" for each address respectively indicate that the directions of the arrows alternate from one address to the next in successive address between the posts of the rows and columns of FIG. 1 in a manner determinative of the polarity of the read-out pulse as is described hereinafter.

A binary "1" is stored in bit address *ad* of FIG. 2 by applying from sources 14 and 15 of FIG. 1 respectively, under the control of timing circuit 18, a positive substantially half select pulse to the conductor $y_3'$ and a negative substantially half select pulse to the conductor $x_4'$, the magnetic fields established in overlay 13 thereover being indicated by arrows 21' and 25' respectively directed to the left between posts 12*a* and 12*d* as viewed in FIG. 2. The resultant magnetic field switches flux in overlay 13 of FIG. 1 between posts 12*a* and 12*d* to a first remanent condition, that is, to the left as shown by arrow 29 of FIG. 2.

Similarly, a binary "1" is stored in bit address *bc* of FIG. 2 by applying from sources 15 and 14 of FIG. 1 respectively, under the control of timing circuit 18, a positive substantially half select pulse to the conductor $x_5'$ and a negative substantially half select pulse to the conductor $y_4'$, the magnetic fields established in overlay 13 thereover being directed to the right between posts 12*b* and 12*c* of FIG. 2 as indicated by arrows 22' and 26' respectively. The resultant magnetic field switches flux in overlay 13 of FIG. 1 between posts 12*b* and 12*c* to a first remanent condition, that is, to the right as shown by arrow 30 of FIG. 2.

A binary "0" is stored in bit address *ad* by applying from source 14 of FIG. 1, under the control of timing circuit 18, a positive substantially half select pulse to the conductor $y_3'$, there being no coincident pulse applied to conductor $x_4'$. Similarly, a binary "0" is stored in bit address *bc* by applying from source 14 of FIG. 1, under the control of timing circuit 18, a negative substantially half select pulse to the conductor $y_4'$. In each address the binary "0" is represented in the overlay 13 thereby flux directed oppositely to that shown in the arrows representing a binary "1" there. Thus there is defined an information bit address in the overlay between each pair of posts in the rows and columns of the array of posts providing, for the four post group of FIG. 2, a one-bit-per-two-post storage capacity. However, each post is utilized in four different addresses as is illustrated by the arrows 23, 29, 31 and 32 in connection with post 12*a*, the last two arrows being directed at posts not shown in FIG. 2.

The write phase of operation and the flux conditions resulting therefrom as described in connection with FIG. 2 are illustrative of the operation of the entire memory of FIG. 1, information being stored in discrete addresses therein during the write phase of operation by the provision of coincident pulses in appropriate $x'$ and $y'$ conductors for storing a "1" or by the provision of a pulse in the appropriate $y'$ conductor only for storing a "0."

It is noted that the sensing conductor 16 shown in FIG. 1 couples each between-post length of the overlay, that is to say, each information address in the memory. Accordingly, read out of a particular address is provided, under the control of timing circuit 18 of FIG. 1, by applying during the read phase of operation to each of the $x'$ and $y'$ conductors coupling that particular address a pulse of a polarity opposite to that applied to that same conductor for storing a "1" there during the write phase of operation. Thus the flux in the overlay there is driven toward the second remanent condition for that address during the read phase of operation. If a "1" is stored in the address, flux is switched in response to the read pulse. As has been described hereinbefore and as is apparent from FIG. 2 adjacent addresses between the rows and columns of posts have flux representing a "1" directed in opposite directions. Consequently, pulses are received by the detection circuit which pulses are either positive or negative depending on the direction with respect to the sensing conductor of the flux switched in the selected address. If a "0" is stored, the address already is in the second remanent condition for that address, that is, saturated in a direction urged by the pulses and only insignificant shuttling of flux results. Thus, no significant pulse is received by the detection circuit during the read phase of operation if a "0" is stored in the interrogated address.

The particular path of the sensing conductor is chosen because the path consists of connected straight conductors and is easy to fabricate and understand. Other paths for the sensing conductor enabling all positive or, alternatively, all negative outputs therein regardless of the address interrogated are readily ascertainable by one skilled in the art.

In the illustrative embodiment, the coupling of the conductors defining a bit address in overlay 13 is realized advantageously by intersecting them in accordance with simple and straightforward fabrication techniques. However, other arrangements of conductors may be employed to achieve the necessary coupling in the absence of a physical intersection.

It is to be understood that the described embodiment is but illustrative of the principles of this invention and various modifications may be made therein by one skilled in the art without departing from the scope and spirit of the invention as defined by the accompanying claims.

What is claimed is:

1. A magnetic memory circuit comprising a first magnetic plate having a plurality of posts protruding therefrom, said posts being arranged in an array of rows and columns, a second magnetic plate having substantially rectangular hysteresis characteristics for completing flux paths between each post and its adjacent posts, and a plurality of first and second drive conductors positioned along first and second diagonals of said array such that said drive conductors intersect uniquely between each post and each of the adjacent posts in said rows and columns.

2. A magnetic memory circuit comprising a first magnetic plate having a plurality of posts protruding therefrom, said posts being arranged in an array of rows and columns, a second magnetic plate having substantially rectangular hysteresis characteristics overlying said posts, a plurality of first and second conductors positioned between said posts along first and second diagonals of said array, said plurality of first and second conductors having a unique intersection between each post and each of its adjacent posts in said rows and columns, each of said intersections defining in said second plate thereover an information address, and a third conductor positioned between said posts along a path intersecting each of said information addresses.

3. In combination, a first magnetic plate having a plurality of posts protruding therefrom, said posts being arranged in an array of rows and columns, a second magnetic plate having substantially rectangular hysteresis characteristics for completing flux paths between each post and its adjacent posts, a plurality of first and second conductors positioned between said posts such that a unique pair of first and second conductors thereof couple the flux path between each post and each of its adjacent posts in said rows and columns, and means for applying to selected ones of said plurality of first and second conductors coincident pulses for driving to a remanent state the flux in a selected one of said flux paths.

4. A magnetic memory circuit comprising a first magnetic plate having a plurality of posts protruding therefrom, said posts being arranged in an array of rows and columns, a second magnetic plate having substantially rectangular hysteresis characteristics for completing flux paths between each post and its adjacent posts, a plurality of first and second conductors arranged between said posts along first and second diagonals of said array such that different first and second conductors intersect uniquely between each post and each of its adjacent posts in said rows and columns, and means for applying to selected ones of said first and second conductors coincident pulses for driving to a remanent state the flux in a selected one of said flux paths.

5. A magnetic memory circuit comprising a first magnetic plate having a plurality of posts protruding therefrom, said posts being arranged in an array of rows and columns so as also to define a plurality of first and second diagonals therebetween, a second magnetic plate having substantially rectangular hysteresis characteristics for providing a flux path between each of said posts and its adjacent posts, a plurality of first and second conductors arranged along said plurality of first and second of said diagonals respectively, unique pairs of said first and second conductors being coupled to said second magnetic plate and defining information addresses thereon between each of said posts and its adjacent posts in said rows and columns, and means for selectively applying write signals to said unique pairs of first and second conductors for establishing at said information addresses in said second magnetic plate flux states representative of binary information.

6. A magnetic circuit in accordance with claim 5 also comprising means for selectively applying read signals to said unique pairs of first and second conductors, and a sensing conductor arranged between each of the adjacent posts of said array of posts and coupled to said second magnetic plate at each of said information addresses.

References Cited by the Examiner

UNITED STATES PATENTS

| | | | |
|---|---|---|---|
| 2,825,891 | 3/1958 | Duinker | 340—174 |
| 3,268,876 | 8/1966 | Norris et al. | 340—174 |

BERNARD KONICK, *Primary Examiner.*

S. URYNOWICZ, *Assistant Examiner.*